(12) United States Patent
Yang et al.

(10) Patent No.: US 10,321,482 B2
(45) Date of Patent: Jun. 11, 2019

(54) METHOD AND DEVICE FOR PROCESSING CARRIER RESOURCE OF UNLICENSED CARRIER AND TRANSMISSION NODE

(71) Applicant: ZTE Corporation, Shenzhen (CN)

(72) Inventors: Weiwei Yang, Shenzhen (CN); Bo Dai, Shenzhen (CN); Chunli Liang, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/514,567

(22) PCT Filed: Apr. 7, 2015

(86) PCT No.: PCT/CN2015/076005
§ 371 (c)(1),
(2) Date: Mar. 27, 2017

(87) PCT Pub. No.: WO2016/045349
PCT Pub. Date: Mar. 31, 2016

(65) Prior Publication Data
US 2017/0231001 A1  Aug. 10, 2017

(30) Foreign Application Priority Data
Sep. 25, 2014 (CN) .......................... 2014 1 0498625

(51) Int. Cl.
*H04W 72/00* (2009.01)
*H04W 74/08* (2009.01)
(Continued)

(52) U.S. Cl.
CPC ........... *H04W 74/08* (2013.01); *H04W 16/14* (2013.01); *H04W 72/0446* (2013.01); *H04W 72/10* (2013.01); *H04W 74/0808* (2013.01)

(58) Field of Classification Search
CPC ... H04W 24/00; H04W 72/082; H04W 16/14; H04W 48/16; H04W 48/12
(Continued)

(56) References Cited

U.S. PATENT DOCUMENTS

2008/0112375 A1* 5/2008 Bennett ................ H04L 1/0007
370/338
2008/0200147 A1* 8/2008 Nylander ............ H04L 63/0853
455/411
(Continued)

FOREIGN PATENT DOCUMENTS

CN        101754242 A    6/2010
CN        102301636 A    12/2011
(Continued)

OTHER PUBLICATIONS

International Search Report for corresponding application No. PCT/CN2015/076005 filed on Apr. 7, 2015; dated Jul. 6, 2015.
(Continued)

*Primary Examiner* — Dai Phuong
(74) *Attorney, Agent, or Firm* — Cantor Colburn LLP

(57) ABSTRACT

A method and device for processing carrier resource of an unlicensed carrier and a transmission node are disclosed. The method includes: determining, in a competitive way, to access the unlicensed carrier in a transmission window; and accessing, according to a predetermined access condition, the unlicensed carrier, wherein the predetermined access condition includes at least one of: a determined length of the transmission window, the maximum access times in the transmission window and the maximum access time in the transmission window.

19 Claims, 5 Drawing Sheets

An unlicensed carrier is determined, in a competitive way, to be accessed in a transmission window — S102

The unlicensed carrier is accessed according to a predetermined access condition, wherein the predetermined access condition includes at least one of: a determined length of the transmission window, the maximum access times in the transmission window and the maximum access time in the transmission window — S104

(51) Int. Cl.
*H04W 16/14* (2009.01)
*H04W 72/04* (2009.01)
*H04W 72/10* (2009.01)

(58) Field of Classification Search
USPC .......... 455/447, 450–454; 370/329–333, 252
See application file for complete search history.

(56) References Cited

U.S. PATENT DOCUMENTS

| | | | |
|---|---|---|---|
| 2009/0170498 A1* | 7/2009 | Venkatasubramanian | H04W 48/20 455/422.1 |
| 2013/0315152 A1* | 11/2013 | Ratasuk | H04W 76/14 370/329 |
| 2013/0343288 A1* | 12/2013 | Ratasuk | H04W 72/1215 370/329 |
| 2014/0036853 A1* | 2/2014 | Kim | H04W 16/14 370/329 |
| 2014/0287769 A1* | 9/2014 | Taori | H04W 74/0808 455/450 |
| 2016/0007322 A1* | 1/2016 | Agardh | H04W 72/04 370/329 |
| 2016/0057731 A1* | 2/2016 | Damnjanovic | H04W 68/005 455/458 |
| 2016/0073344 A1* | 3/2016 | Vutukuri | H04W 52/0216 370/252 |
| 2017/0288823 A1* | 10/2017 | Bhushan | H04W 28/0289 |
| 2018/0175975 A1* | 6/2018 | Um | H04L 1/1816 |

FOREIGN PATENT DOCUMENTS

| | | |
|---|---|---|
| CN | 102378302 A | 3/2012 |
| CN | 103650622 A | 3/2014 |

OTHER PUBLICATIONS

European Search Report for corresponding application EP 15 84 4680; Report dated Sep. 20, 2017.

* cited by examiner

METHOD AND DEVICE FOR PROCESSING CARRIER RESOURCE OF UNLICENSED CARRIER AND TRANSMISSION NODE

TECHNICAL FIELD

The disclosure relates to the field of communications, and in particular to a method and device for processing carrier resource of an unlicensed carrier and a transmission node.

BACKGROUND

It has been well known so far that Long-Term Evolution (LTE) works by being deployed in a licensed carrier. However, as data services increase rapidly, licensed spectrums will be incapable of bearing such a great quantity of data before long. Thus, deploying the LTE in unlicensed spectrums to reduce data traffic in licensed spectrums through the unlicensed spectrums is an important evolution tendency of a further development of the LTE.

Moreover, the unlicensed spectrums have many advantages: it is free or low-cost (it is not needed to buy the unlicensed spectrums, thus, cost on frequency spectrum resources is zero); requirements of the unlicensed spectrums on access is low and access cost of the unlicensed spectrums is low (both individuals and enterprises can participate in deployment and there is no requirements on devices of operators); the unlicensed spectrums are capable of sharing resources (some methods for sharing resources can be considered to improve frequency spectrum efficiency in a case where a plurality of different systems work on the unlicensed spectrums or in a case where different operators of the same system work on the unlicensed spectrums); the unlicensed spectrums are applicable to multiple wireless access technologies (cross-communication standard, poor in cooperative performance and varying in network topology); the unlicensed spectrums have a plenty of wireless access stations (a great number of users, low cooperation and high centralized management cost); and the unlicensed spectrums have a great number of applications (it is mentioned in documents that many services such as Machine to Machine (M2M) and Vehicle to Vehicle (V2V) can work on the unlicensed spectrums).

However, for the unlicensed spectrums, there may be a plurality of systems, for example, WIFI systems, working on the same frequency spectrum. Thus, when a system (e.g. an LTE system) works on an unlicensed spectrum (or called an unlicensed carrier), it is crucial to solve a problem of a coexistence of the system with other systems.

Thus, the problem of the coexistence of the system working on the unlicensed carrier with other systems exists in the related art.

SUMMARY

The disclosure provides a method and device for processing carrier resource of an unlicensed carrier and a transmission node, so as at least to address a problem of a coexistence of a system working on the unlicensed carrier with other systems existing in the related art.

In an embodiment of the disclosure, a method for processing carrier resource of an unlicensed carrier is provided, which includes: determining, in a competitive way, to access the unlicensed carrier in a transmission window; and accessing, according to a predetermined access condition, the unlicensed carrier, wherein the predetermined access condition includes at least one of: a determined length of the transmission window, the maximum access times in the transmission window and the maximum access time in the transmission window.

In an example embodiment, the predetermined condition is determined in at least one of the following way: the length of the transmission window is determined in at least one of the following ways: the length of the transmission window is predefined, the length of the transmission window is indicated by a high-layer signaling, and the length of the transmission window is obtained by being adjusted according to at least one of utilization condition and interference condition of resources on the unlicensed resource which is obtained in a detection window corresponding to the transmission window; the maximum access times or the maximum access time in the transmission window is determined in the following way: the maximum access times or the maximum access time is obtained by being adjusted according to at least one of utilization condition and interference condition of resources on the unlicensed resource which is obtained in a detection window corresponding to the transmission window.

In an example embodiment, determining, in the competitive way, to access the unlicensed carrier in the transmission window includes: generating k random numbers $N_0, N_1, \ldots N_{k-1}$ in the transmission window $[0, Y]$, wherein $N_j$ represents a start time point of the jth accessing the unlicensed carrier and $0<j<=k-1$, a value of k is determined according to a quantity of data to be transmitted and a time period consumed for accessing the unlicensed carrier every time, a value of Y is determined according to the length of the transmission window; and starting the jth accessing the unlicensed carrier from the time point $N_j$ when an idle time period of a length of a Clear Channel Assessment (CCA) is detected from the time point $N_j$.

In an example embodiment, determining, in a competitive way, to access the unlicensed carrier in the transmission window includes: determining whether or not a transmission node conflicts with another transmission node according to received access information, wherein the access information refers to information, which is sent by the other transmission node and, during the jth accessing the unlicensed carrier, corresponds to the rest (k−j) times of accessing the unlicensed carrier, wherein k is a total access times in the transmission windows and $0<j<=k-1$; and determining to access the unlicensed carrier according to priorities of transmission nodes when a determination result is that the transmission node conflicts with the other transmission node.

In an example embodiment, before accessing the unlicensed carrier according to the priorities of transmission nodes, the method further includes: determining a priority of the transmission node according to at least one of the following factors: start time point for accessing, by the transmission node, the unlicensed carrier; start time point for once before accessing, by the transmission node, the unlicensed carrier starts; and a priority of a service on the transmission node.

In an example embodiment, before accessing the unlicensed carrier according to the predetermined access condition, the method further includes: adjusting the length of the transmission window according to at least one of the utilization condition and the interference condition of the resources on the unlicensed resource that is obtained in the detection window corresponding to the transmission window, wherein the length of the transmission window is increased or decreased with respect to a length of a former transmission window; and adjusting the maximum access times or the maximum access time according to at least one of the utilization condition and the interference condition of the resources on the unlicensed resource that is obtained in the detection window corresponding to the transmission window, wherein the maximum access times or the maximum access time in the transmission window is increased or decreased with respect to the maximum access times or the maximum access time in a former transmission window.

In an example embodiment, the length of the transmission window is increased with respect to the length of the former transmission window when at least one of the following conditions is met: a occupancy rate of the unlicensed carrier in the detection window corresponding to the transmission window is detected to be greater than a first preset threshold; a utilization rate of the unlicensed carrier in the detection window corresponding to the transmission window is detected to be smaller than a second preset threshold; a level of interference to the transmission node in the detection window corresponding to the transmission window is detected to be greater than a third preset threshold; the maximum access times in the transmission window is greater than a maximum value preset for the maximum access times; and the maximum access time in the transmission window is greater than a maximum value preset for the maximum access time.

In an example embodiment, the length of the transmission window is decreased with respect to the length of the former transmission window when at least one of the following conditions is met: a occupancy rate of the unlicensed carrier in the detection window corresponding to the transmission window is detected to be smaller than a first preset threshold; a utilization rate of the unlicensed carrier in the detection window corresponding to the transmission window is detected to be smaller than a second preset threshold; a level of interference to the transmission node in the detection window corresponding to the transmission window is detected to be smaller than a third preset threshold; the maximum access times in the transmission window is smaller than a minimal value preset for the maximum access times; and the maximum access time in the transmission window is smaller than a minimal value preset for the maximum access time.

In an example embodiment, the maximum access times or the maximum access time in the transmission window is increased with respect to the maximum access times or the maximum access time in the former transmission window when at least one of the following conditions is met: a occupancy rate of the unlicensed carrier in the detection window corresponding to the transmission window is detected to be smaller than a first preset threshold; a utilization rate of the unlicensed carrier in the detection window corresponding to the transmission window is smaller than a second preset threshold; a level of interference to the transmission node in the detection window corresponding to the transmission window is smaller than a third preset threshold; and the length of the transmission window reaches a preset maximum transmission window length.

In an example embodiment, the maximum access times or the maximum access time in the transmission window is decreased with respect to the maximum access times/the maximum access time in the former transmission window when at least one of the following conditions is met: a occupancy rate of the unlicensed carrier in the detection window corresponding to the transmission window is greater than a first preset threshold; a utilization rate of the unlicensed carrier in the detection window corresponding to the transmission window is greater than a second preset threshold; a level of interference to the transmission node in the detection window corresponding to the transmission window is greater than a third preset threshold; and the length of the transmission window reaches a preset minimal transmission window length.

In an example embodiment, in a case where the adjusted length of the transmission window is greater than the preset maximum transmission window length, the length of the transmission window is determined to be the preset maximum transmission window length, and in a case where the adjusted length of the transmission window is smaller than the preset minimal transmission window length, the length of the transmission window is determined to be the preset minimal transmission window length; and in a case where the adjusted maximum access times is greater than the maximum value preset for the maximum access times, the maximum access times is determined to be the maximum value preset for the maximum access times; in a case where the adjusted maximum access time is greater than the maximum value preset for the maximum access time, the maximum access time is determined to be the maximum value preset for the maximum access time; in a case where the adjusted maximum access times is smaller than the minimal value preset for the maximum access times, the maximum access times is determined to be the minimal value preset for the maximum access times; and in a case where the adjusted maximum access time is smaller than the minimal value preset for the maximum access time, the maximum access time is determined to be the minimal value preset for the maximum access time.

In an example embodiment, the detection window includes at least one of: a former transmission window of the transmission window, a part of a former transmission window of the transmission window, N preceding transmission windows of the transmission window, and a window with a preset time length.

In another embodiment of the disclosure, a device for processing carrier resource of an unlicensed carrier is provided, which includes: a first determination component arranged to determine, in a competitive way, to access to the unlicensed carrier in a transmission window; and an access component arranged to access, according to a predetermined access condition, the unlicensed carrier, wherein the predetermined access condition includes at least one of: a determined length of the transmission window, the maximum access times in the transmission window and the maximum access time in the transmission window.

In an example embodiment, the first determination component includes: a generation element arranged to generate k random numbers $N_0, N_1, \ldots N_{k-1}$ in the transmission window $[0, Y]$, wherein $N_j$ represents a start time point of the jth accessing to the unlicensed carrier starts and $0<j<=k-1$, a value of k is determined according to a quantity of data to be transmitted and a time period consumed for accessing the unlicensed carrier every time, a value of Y is determined according to the length of the transmission window; and a first determination element arranged to start the jth accessing to the unlicensed carrier from the time point $N_j$ when an idle time period of a length of a Clear Channel Assessment (CCA) is detected from the time point $N_j$.

In an example embodiment, the first determination component includes: a determination element arranged to determine whether or not a transmission node conflicts with another transmission node according to the received access information, wherein the access information refers to information, which is sent by the other transmission node and, during the jth accessing the unlicensed carrier, corresponds to the rest (k-j) times of accessing the unlicensed carrier, wherein k is a total access times in the transmission windows and $0<j<=k-1$; and a second determination element arranged to determine to access the unlicensed carrier according to priorities of transmission nodes when a determination result is that the transmission node conflicts with the other transmission node.

In an example embodiment, the device further includes: a third determination element arranged to determine a priority of the transmission node according to at least one of the following factors: start time point for accessing, by the transmission node, the unlicensed carrier; start time point for once before accessing, by the transmission node, the unlicensed carrier starts; and a priority of a service on the transmission node.

In an example embodiment, the device further includes: a first adjustment component arranged to adjust the length of the transmission window according to at least one of the utilization condition and the interference condition of the resources on the unlicensed resource that is obtained in the detection window corresponding to the transmission window, wherein the length of the transmission window is increased or decreased with respect to a length of a former transmission window; and a second adjustment component arranged to adjust the maximum access times or the maximum access time according to at least one of the utilization condition and the interference condition of the resources on the unlicensed resource that is obtained in the detection window corresponding to the transmission window, wherein the maximum access times or the maximum access time in the transmission window is increased or decreased with respect to the maximum access times or the maximum access time in a former transmission window.

In an example embodiment, the first adjustment component is also arranged to increase the length of the transmission window with respect to the length of the former transmission window when at least one of the following conditions is met: a occupancy rate of the unlicensed carrier in the detection window corresponding to the transmission window is detected to be greater than a first preset threshold; a utilization rate of the unlicensed carrier in the detection window corresponding to the transmission window is detected to be smaller than a second preset threshold; a level of interference to the transmission node in the detection window corresponding to the transmission window is detected to be greater than a third preset threshold; the maximum access times in the transmission window is greater than a maximum value preset for the maximum access times; and the maximum access time in the transmission window is greater than a minimal value of a preset maximum access times.

In an example embodiment, the first adjustment component is also arranged to decrease the length of the transmission window with respect to the length of the former transmission window when at least one of the following conditions is met: a occupancy rate of the unlicensed carrier in the detection window corresponding to the transmission window is detected to be smaller than a first preset threshold; a utilization rate of the unlicensed carrier in the detection window corresponding to the transmission window is detected to be smaller than a second preset threshold; a level of interference to the transmission node in the detection window corresponding to the transmission window is detected to be smaller than a third preset threshold; the maximum access times in the transmission window is smaller than a minimal value preset for the maximum access times; and the maximum access time in the transmission window is smaller than a minimal value of a preset maximum access time.

In an example embodiment, the second adjustment component is also arranged to increase the maximum access times or the maximum access time in the transmission window with respect to the maximum access times or the maximum access time in the former transmission window when at least one of the following conditions is met: a occupancy rate of the unlicensed carrier in the detection window corresponding to the transmission window is detected to be smaller than a first preset threshold; a utilization rate of the unlicensed carrier in the detection window corresponding to the transmission window is smaller than a second preset threshold; a level of interference to the transmission node in the detection window corresponding to the transmission window is smaller than a third preset threshold; and the length of the transmission window reaches a preset maximum transmission window length.

In an example embodiment, the second adjustment component is also arranged to decrease the maximum access times or the maximum access time in the transmission window with respect to the maximum access times/the maximum access time in the former transmission window when at least one of the following conditions is met: a occupancy rate of the unlicensed carrier in the detection window corresponding to the transmission window is greater than a first preset threshold; a utilization rate of the unlicensed carrier in the detection window corresponding to the transmission window is greater than a second preset threshold; a level of interference to the transmission node in the detection window corresponding to the transmission window is greater than a third preset threshold; and the length of the transmission window reaches a preset minimal transmission window length.

In an example embodiment, the second determination component is arranged to determine the length of the transmission window to be the preset maximum transmission window length in a case where the adjusted length of the transmission window is greater than the preset maximum transmission window length, determine the length of the transmission window to be the preset minimal transmission window length in a case where the adjusted length of the transmission window is smaller than the preset minimal transmission window length; and the third determination component is arranged to determine the maximum access times is determined to be the maximum value preset for the maximum access times in a case where the adjusted maximum access times is greater than the maximum value preset for the maximum access times; determine the maximum access time to be the maximum value preset for the maximum access time in a case where the adjusted maximum access time is greater than the maximum value preset for the maximum access time; determine the maximum access times to be the minimal value preset for the maximum access times in a case where the adjusted maximum access times is smaller than the minimal value preset for the maximum access times; and determine the maximum access time to be the minimal value preset for the maximum access time in a case where the adjusted maximum access time is smaller than the minimal value preset for the maximum access time.

In another embodiment of the disclosure, a transmission node is provided, which includes above-mentioned device for processing carrier resource of the unlicensed carrier. By determining, in a competitive way, to access the unlicensed carrier in a transmission window; and accessing, according to a predetermined access condition, the unlicensed carrier, wherein the predetermined access condition includes at least one of: a determined length of the transmission window, the maximum access times in the transmission window and the maximum access time in the transmission window. The disclosure addresses the problem of the coexistence of the system working on the unlicensed carrier with other systems and consequentially realizes the coexistence of the system working on the unlicensed carrier with other systems, for example, the disclosure increases the utilization rate of the unlicensed carrier by making full use of idle resources of the unlicensed carrier.

BRIEF DESCRIPTION OF THE DRAWINGS

The accompanying drawings described herein which are incorporated into and form a part of the application are provided for the better understanding of the disclosure, and exemplary embodiments of the disclosure and the description of the exemplary embodiments serve to illustrate the present but are not to be construed as improper limitations to the disclosure. In the accompanying drawings.

DETAILED DESCRIPTION

The disclosure will be described below in detail with reference to accompanying drawings when read in conjunction with specific embodiments. It should be noted that the embodiments of the disclosure and the features thereof can be combined with each other if no conflict is caused.

Figure 1:
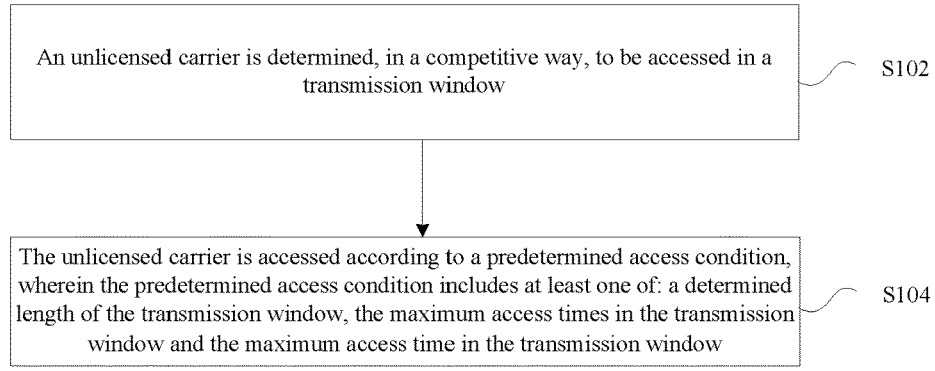
FIG. 1 is a flowchart illustrating a method for processing carrier resource of an unlicensed carrier according to an embodiment of the disclosure.

A method for processing carrier resource of an unlicensed carrier is provided in embodiments of the disclosure. FIG. 1 is a flowchart illustrating method for processing a carrier resource of an unlicensed carrier according to an embodiment of the disclosure, and as shown in FIG. 1, the flow includes the following steps:

At S102: an unlicensed carrier is determined, in a competitive way, to be accessed in a transmission window;

At S104: the unlicensed carrier is accessed according to a predetermined access condition, wherein the predetermined access condition includes at least one of: a determined length of the transmission window, the maximum access times in the transmission window and the maximum access time in the transmission window.

By executing the foregoing steps to determine, in the competitive way, to access the unlicensed carrier in the transmission window and access the unlicensed carrier according to the predetermined access condition, the method for processing carrier resource of an unlicensed carrier addresses the problem of the coexistence of the system working on the unlicensed carrier with other systems and consequentially realizes the coexistence of the system working on the unlicensed carrier with other systems, for example, the method for processing carrier resource of the unlicensed carrier increases the utilization rate of the unlicensed carrier by making full use of idle resources of the unlicensed carrier. It should be noted that the following description is based on an example of an access of a first system to an unlicensed carrier.

A transmission node corresponding to the first system accesses the unlicensed spectrum in the transmission window in the competitive way, in which the access is limited to be conducted when: the access times in the transmission window is smaller than or equal to the maximum access times, or the access time in the transmission window is smaller than or equal to the maximum access time, moreover the maximum access times or the maximum access time is adjusted according to at least one of utilization condition and interference condition of the resources on the unlicensed resource that is obtained in a corresponding detection window.

The length of the transmission window can be obtained in a plurality of ways, for example, in at least one of the following ways: the length of the transmission window is predefined, the length of the transmission window is indicated by a high-layer signaling, and the length of the transmission window is obtained by being adjusted according to at least one of utilization condition and the interference condition of resources on the unlicensed resource which is obtained in a detection window corresponding to the transmission window. The maximum access times or the maximum access time in the transmission window can be determined in the following way: the maximum access times or the maximum access time is obtained by being adjusted according to at least one of utilization condition and interference condition of resources on the unlicensed resource which is obtained in a detection window corresponding to the transmission window.

The step of determining, in the competitive way, to access the unlicensed carrier in the transmission window includes: generating k random numbers $N_0, N_1, \ldots N_{k-1}$ in the transmission window $[0, Y]$, wherein $N_j$ represents a start time point of the jth accessing the unlicensed carrier and $0<j<=k-1$, a value of k is determined according to a quantity of data to be transmitted and a time period consumed for accessing the unlicensed carrier every time, a value of Y is determined according to the length of the transmission window; and starting the jth accessing the unlicensed carrier from the time point $N_j$ when an idle time period of a length of a Clear Channel Assessment (CCA) is detected from the time point $N_j$. That is, taking $N_j$ as the time point the transmission node corresponding to the first system starts to access the unlicensed carrier for the jth time means that an LTE-U station starts to detect a state of the unlicensed carrier from the time point $N_j$ and the transmission node corresponding to the first system accesses the unlicensed carrier for the jth time when an idle time period of the length of the CCA is detected, and the length of the CCA is smaller than or equal to 50 us.

In the embodiment of the disclosure, determining, in the competitive way, to access the unlicensed carrier in the transmission window includes: whether or not a transmission node conflicts with another transmission node is determined according to received access information, and the access information refers to information, which is sent by the other transmission node and, during the jth accessing the unlicensed carrier, corresponds to the rest (k−j) times of accessing the unlicensed carrier, in which k is a total access times in the transmission windows and $0<j<=k-1$; and the unlicensed carrier is determined to be accessed according to priorities of transmission nodes when a determination result is that the transmission node conflicts with the other transmission node.

The process that the transmission node corresponding to the first system accesses the unlicensed spectrum in the transmission window in the competitive way refers to a process that the transmission node corresponding to the first system carries access information corresponding to the rest (k−j) times of access when accessing the unlicensed spectrum for the jth time and determines, after receiving access starting time point of the other transmission nodes corresponding to the first system, a corresponding access starting time point according to priorities when the received access starting time point of the other transmission nodes corresponding to the first system is the same as the access starting time point of the transmission node.

The process that the transmission node corresponding to the first system determines a corresponding competitive access starting time according to priorities refers to that the access time point of an LTE transmission node lower in priority is postponed.

Before the jth access to the unlicensed carrier is competed for from the time point $N_j$ according to priorities of transmission nodes, the method further includes: determining a priority of a transmission node according to at least one of the following factors: start time point for accessing, by the transmission node, the unlicensed carrier; start time point for once before accessing, by the transmission node, the unlicensed carrier starts; and a priority of a service on the transmission node.

The times of the access of the transmission node corresponding to the first system in the transmission window being smaller than or equal to the maximum access times means that the access of the transmission node is stopped when the value of k is greater than K, in which K is the maximum access times.

The access time of the transmission node corresponding to the first system in the transmission window being smaller than or equal to the maximum access time means that the access of the transmission node is stopped when a total of time elapsing after each access is greater than T, in which T is the maximum access time.

In the embodiment of the disclosure, before accessing the unlicensed carrier according to the predetermined access condition, the method further includes: the length of the transmission window is adjusted according to at least one of the utilization condition and the interference condition of the resources on the unlicensed resource that is obtained in the detection window corresponding to the transmission window, moreover the length of the transmission window is increased or decreased with respect to a length of a former transmission window; and the maximum access times or the maximum access time is adjusted according to at least one of the utilization condition and the interference condition of the resources on the unlicensed resource that is obtained in the detection window corresponding to the transmission window, moreover the maximum access times or the maximum access time in the transmission window is increased or decreased with respect to the maximum access times or the maximum access time in a former transmission window.

The length of the transmission window is increased with respect to the length of the former transmission window when at least one of the following conditions is met: a occupancy rate of the unlicensed carrier in the detection window corresponding to the transmission window is detected to be greater than a first preset threshold; a utilization rate of the unlicensed carrier in the detection window corresponding to the transmission window is detected to be smaller than a second preset threshold; a level of interference to the transmission node in the detection window corresponding to the transmission window is detected to be greater than a third preset threshold; the maximum access times in the transmission window is greater than a maximum value preset for the maximum access times; and the maximum access time in the transmission window is greater than a maximum value preset for the maximum access time.

The length of the transmission window is decreased with respect to the length of the former transmission window when at least one of the following conditions is met: a occupancy rate of the unlicensed carrier in the detection window corresponding to the transmission window is detected to be smaller than a first preset threshold; a utilization rate of the unlicensed carrier in the detection window corresponding to the transmission window is detected to be smaller than a second preset threshold; a level of interference to the transmission node in the detection window corresponding to the transmission window is detected to be smaller than a third preset threshold; the maximum access times in the transmission window is smaller than a minimal value preset for the maximum access times; and the maximum access time in the transmission window is smaller than a minimal value preset for the maximum access time.

The maximum access times or the maximum access time in the transmission window is increased with respect to the maximum access times or the maximum access time in the former transmission window when at least one of the following conditions is met: a occupancy rate of the unlicensed carrier in the detection window corresponding to the transmission window is detected to be smaller than a first preset threshold; a utilization rate of the unlicensed carrier in the detection window corresponding to the transmission window is smaller than a second preset threshold; a level of interference to the transmission node in the detection window corresponding to the transmission window is smaller than a third preset threshold; and the length of the transmission window reaches a preset maximum transmission window length.

The maximum access times or the maximum access time in the transmission window is decreased with respect to the maximum access times/the maximum access time in the former transmission window when at least one of the following conditions is met: a occupancy rate of the unlicensed carrier in the detection window corresponding to the transmission window is greater than a first preset threshold; a utilization rate of the unlicensed carrier in the detection window corresponding to the transmission window is greater than a second preset threshold; a level of interference to the transmission node in the detection window corresponding to the transmission window is greater than a third preset threshold; and the length of the transmission window reaches a preset minimal transmission window length.

In a case where the adjusted length of the transmission window is greater than the preset maximum transmission window length, the length of the transmission window is determined to be the preset maximum transmission window length, and in a case where the adjusted length of the transmission window is smaller than the preset minimal transmission window length, the length of the transmission window is determined to be the preset minimal transmission window length; and in a case where the adjusted maximum access times is greater than the maximum value preset for the maximum access times, the maximum access times is determined to be the maximum value preset for the maximum access times; in a case where the adjusted maximum access time is greater than the maximum value preset for the maximum access time, the maximum access time is determined to be the maximum value preset for the maximum access time; in a case where the adjusted maximum access times is smaller than the minimal value preset for the maximum access times, the maximum access times is determined to be the minimal value preset for the maximum access times; and in a case where the adjusted maximum access time is smaller than the minimal value preset for the maximum access time, the maximum access time is determined to be the minimal value preset for the maximum access time.

That is, when the adjusted maximum access times or the adjusted maximum access time is greater than the maximum value preset for the maximum access times the maximum access time, then the adjusted maximum access times or the adjusted maximum access time is set to be equal to the maximum value preset for the maximum access times or the maximum access time; when the adjusted maximum access times or the adjusted maximum access time is smaller than the minimal value preset for the maximum access times or the maximum access time, then the adjusted maximum access times or the adjusted maximum access time is set to be equal to the minimal value preset for the maximum access times or the maximum access time; when the adjusted length of the transmission window is greater than the preset maximum transmission window length, then the adjusted length of the transmission window is set to be equal to the preset maximum transmission window length; and when the adjusted length of the transmission window is smaller than the preset minimal transmission window length, then the adjusted length of the transmission window is set to be equal to the preset minimal transmission window length.

There may be many types of detection windows, for example, the detection window includes at least one of: a former transmission window of the transmission window, a part of a former transmission window of the transmission window, N preceding transmission windows of the transmission window, and a window with a preset time length. It should be noted that the detection window for detecting the utilization condition of resources may be the same with or different from the detection window for detecting the interference condition.

A device for processing carrier resource of an unlicensed carrier is also provided in the embodiment which is used to realize the foregoing embodiments and example implementation modes, and what has been described above is not described here repeatedly. The term 'component', as used hereinafter, is the combination of software and/or hardware for realizing preset functions. Although the devices described in the following embodiments are implemented as software preferably, the implementation of the devices as hardware or the combination of software and hardware may also be devised.

Figure 2:
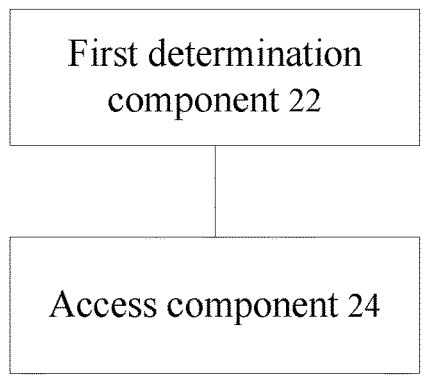
FIG. 2 is a structural block diagram illustrating a device for processing carrier resource of an unlicensed carrier according to an embodiment of the disclosure.

FIG. 2 is a structural block diagram illustrating a device for processing carrier resource of an unlicensed carrier according to an embodiment of the disclosure, as shown in FIG. 2, the device includes: a first determination component 22 and an access component 24, and the device will be described below.

The first determination component 22 is arranged to determine, in a competitive way, to access to the unlicensed carrier in a transmission window; and the access component 24 is connected with the first determination component 22 and arranged to access, according to a predetermined access condition, the unlicensed carrier, moreover the predetermined access condition includes at least one of: a determined length of the transmission window, the maximum access times in the transmission window, and the maximum access time in the transmission window.

Figure 3:
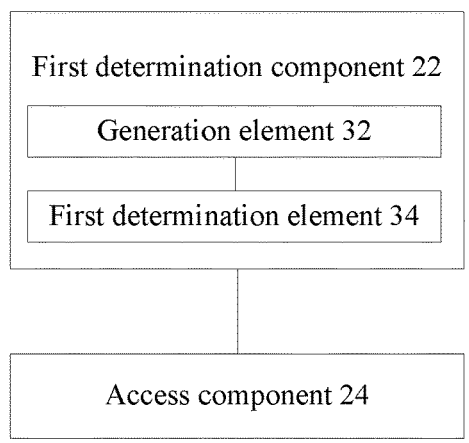
FIG. 3 is a structural block diagram illustrating a first determination component 22 in a device for processing carrier resource of an unlicensed carrier according to a first example embodiment of the disclosure.

FIG. 3 is a first structural block diagram illustrating a first determination component 22 in a device for processing carrier resource of an unlicensed carrier according to a first example embodiment of the disclosure, as shown in FIG. 3, the first determination component 22 includes: a generation element 32 and a first determination element 34, and the first determination component 22 is described below.

The generation element 32 is arranged to generate k random numbers $N_0, N_1, \ldots N_{k-1}$ in the transmission window [0, Y], wherein $N_j$ represents a start time point of the jth accessing to the unlicensed carrier starts and $0<j<=k-1$, a value of k is determined according to a quantity of data to be transmitted and a time period consumed for accessing the unlicensed carrier every time, a value of Y is determined according to the length of the transmission window; and the first determination element 34 is connected with the generation element 32 and arranged to start the jth accessing to the unlicensed carrier from the time point $N_j$ when an idle time period of a length of a Clear Channel Assessment (CCA) is detected from the time point $N_j$.

Figure 4:
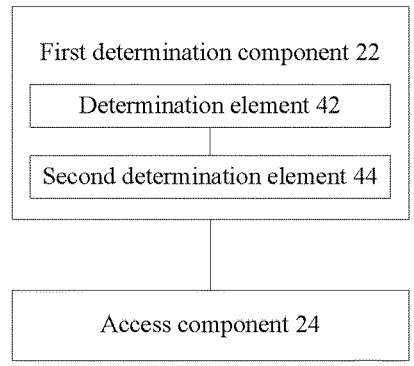
FIG. 4 is a structural block diagram illustrating a first determination component 22 in a device for processing carrier resource of an unlicensed carrier according to a second example embodiment of the disclosure.

FIG. 4 is a structural block diagram illustrating a first determination component 22 in a device for processing carrier resource of an unlicensed carrier according to a second example embodiment of the disclosure, as shown in FIG. 4, the first determination component 22 includes: a determination element 42 and a second determination element 44, and the access element 34 is described below.

The determination element 42 is arranged to determine whether or not a transmission node conflicts with another transmission node according to the received access information, wherein the access information refers to information, which is sent by the other transmission node and, during the jth accessing the unlicensed carrier, corresponds to the rest (k−j) times of accessing the unlicensed carrier, wherein k is a total access times in the transmission windows and $0<j<=k-1$; and the second determination element 44 is connected with the determination element 42 and arranged to determine to access the unlicensed carrier according to priorities of transmission nodes when a determination result is that the transmission node conflicts with the other transmission node.

Figure 5:
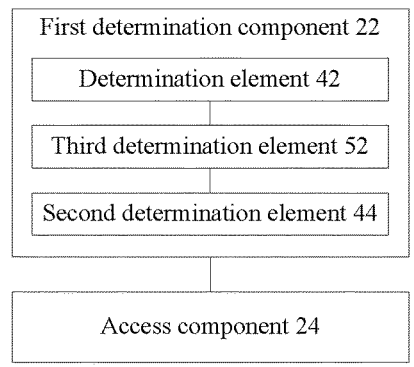
FIG. 5 is a structural block diagram illustrating a first determination component 22 in a device for processing carrier resource of an unlicensed carrier according to a third example embodiment of the disclosure.

FIG. 5 is a structural block diagram illustrating a first determination component 22 in a device for processing carrier resource of an unlicensed carrier according to a third example embodiment of the disclosure, as shown in FIG. 5, in addition to each structure shown in FIG. 4, the first determination component 22 further includes a third determination element 52 which will be described below.

The third determination element 52 is connected with the determination element 42 and the second determination element 44 and arranged to determine a priority of the transmission node according to at least one of the following factors: start time point for accessing, by the transmission node, the unlicensed carrier; start time point for once before accessing, by the transmission node, the unlicensed carrier starts; and a priority of a service on the transmission node.

Figure 6:
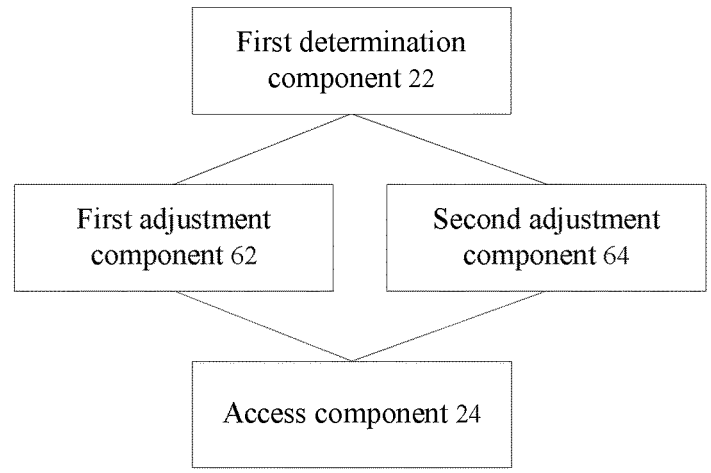
FIG. 6 is a structural block diagram illustrating a device for processing carrier resource of an unlicensed carrier according to a first example embodiment of the disclosure.

FIG. 6 is a structural block diagram illustrating a device for processing carrier resource of an unlicensed carrier according to a first example embodiment of the disclosure, as shown in FIG. 6, in addition to each component shown in FIG. 2, the device further includes at least one of: a first adjustment component 62 and a second adjustment component 64, and the device will be described below.

The first adjustment component is connected with the first determination component 22 and the access component 24 and arranged to adjust the length of the transmission window according to at least one of the utilization condition and the interference condition of the resources on the unlicensed resource that is obtained in the detection window corresponding to the transmission window, in which the length of the transmission window is increased or decreased with respect to a length of a former transmission window; and the second adjustment component 64 is connected with the first determination component 22 and the access component 24 and arranged to adjust the maximum access times or the maximum access time according to at least one of the utilization condition and the interference condition of the resources on the unlicensed resource that is obtained in the detection window corresponding to the transmission window, wherein the maximum access times or the maximum access time in the transmission window is increased or decreased with respect to the maximum access times or the maximum access time in a former transmission window.

In the embodiment of the disclosure, the first adjustment component 62 is also arranged to increase the length of the transmission window with respect to the length of the former transmission window when at least one of the following conditions is met: a occupancy rate of the unlicensed carrier in the detection window corresponding to the transmission window is detected to be greater than a first preset threshold; a utilization rate of the unlicensed carrier in the detection window corresponding to the transmission window is detected to be smaller than a second preset threshold; a level of interference to the transmission node in the detection window corresponding to the transmission window is detected to be greater than a third preset threshold; the maximum access times in the transmission window is greater than a maximum value preset for the maximum access times; and the maximum access time in the transmission window is greater than a minimal value of a preset maximum access times.

In the embodiment of the disclosure, the first adjustment component 62 is also arranged to decrease the length of the transmission window with respect to the length of the former transmission window when at least one of the following conditions is met: a occupancy rate of the unlicensed carrier in the detection window corresponding to the transmission window is detected to be smaller than a first preset threshold; a utilization rate of the unlicensed carrier in the detection window corresponding to the transmission window is detected to be smaller than a second preset threshold; a level of interference to the transmission node in the detection window corresponding to the transmission window is detected to be smaller than a third preset threshold; the maximum access times in the transmission window is smaller than a minimal value preset for the maximum access times; and the maximum access time in the transmission window is smaller than a minimal value of a preset maximum access time.

In the embodiment of the disclosure, the second adjustment component 64 is also arranged to increase the maximum access times or the maximum access time in the transmission window with respect to the maximum access times or the maximum access time in the former transmission window when at least one of the following conditions is met: a occupancy rate of the unlicensed carrier in the detection window corresponding to the transmission window is detected to be smaller than a first preset threshold; a utilization rate of the unlicensed carrier in the detection window corresponding to the transmission window is smaller than a second preset threshold; a level of interference to the transmission node in the detection window corresponding to the transmission window is smaller than a third preset threshold; and the length of the transmission window reaches a preset maximum transmission window length.

In the embodiment of the disclosure, the second adjustment component 64 is also arranged to decrease the maximum access times or the maximum access time in the transmission window with respect to the maximum access times/the maximum access time in the former transmission window when at least one of the following conditions is met: a occupancy rate of the unlicensed carrier in the detection window corresponding to the transmission window is greater than a first preset threshold; a utilization rate of the unlicensed carrier in the detection window corresponding to the transmission window is greater than a second preset threshold; a level of interference to the transmission node in the detection window corresponding to the transmission window is greater than a third preset threshold; and the length of the transmission window reaches a preset minimal transmission window length.

Figure 7:
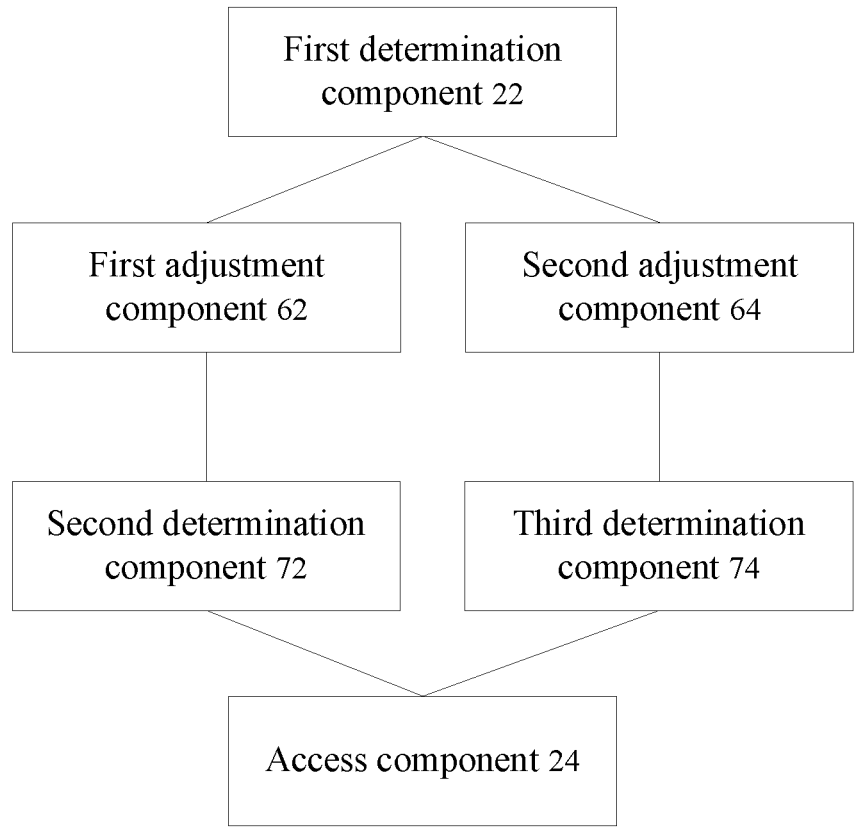
FIG. 7 is a structural block diagram illustrating a device for processing carrier resource of an unlicensed carrier according to a second example embodiment of the disclosure.

FIG. 7 is a structural block diagram illustrating a device for processing carrier resource of an unlicensed carrier according to a second example embodiment of the disclosure, as shown in FIG. 7, in addition to each component shown in FIG. 6, the device further includes at least one of: a second determination component 72 and a third determination component 74, and the device will be described below.

In the embodiment of the disclosure, the second determination component 72 is connected with the first adjustment component 62 and the access component 24 and arranged to determine the length of the transmission window to be the preset maximum transmission window length in a case where the adjusted length of the transmission window is greater than the preset maximum transmission window length, determine the length of the transmission window to be the preset minimal transmission window length in a case where the adjusted length of the transmission window is smaller than the preset minimal transmission window length; the third determination component 74 is connected with the second adjustment component 64 and the access component 24 and arranged to the maximum access times is determined to be the maximum value preset for the maximum access times in a case where the adjusted maximum access times is greater than the maximum value preset for the maximum access times; determine the maximum access time to be the maximum value preset for the maximum access time in a case where the adjusted maximum access time is greater than the maximum value preset for the maximum access time; determine the maximum access times to be the minimal value preset for the maximum access times in a case where the adjusted maximum access times is smaller than the minimal value preset for the maximum access times; and determine the maximum access time to be the minimal value preset for the maximum access time in a case where the adjusted maximum access time is smaller than the minimal value preset for the maximum access time.

Figure 8:
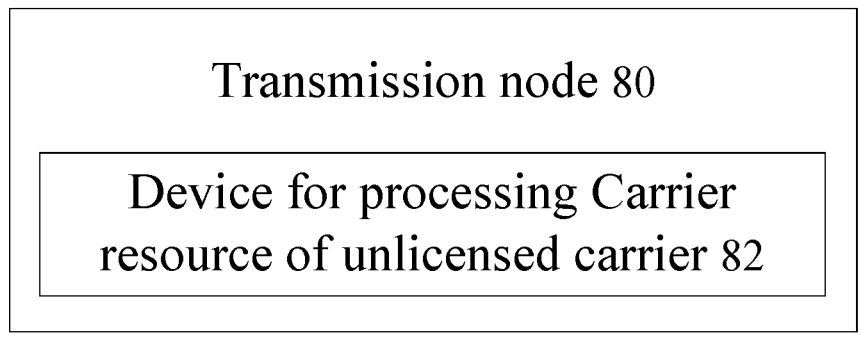
FIG. 8 is a structural block diagram illustrating a transmission node according to an embodiment of the disclosure.

FIG. 8 is a structural block diagram illustrating a transmission node according to an embodiment of the disclosure, and as shown in FIG. 8, the transmission node 80 includes above-mentioned device for processing carrier resource of the unlicensed carrier 82.

Example implementation modes of the disclosure will be described below in detail with reference to specific embodiments when read in conjunction with accompanying drawings.

Example Implementation Mode 1

Figure 9:
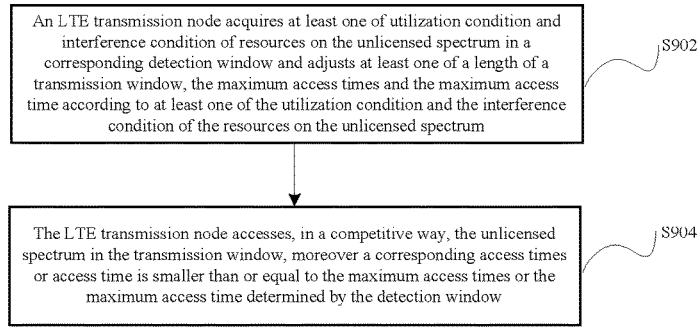
FIG. 9 is a flowchart illustrating a method for processing carrier resource of an unlicensed carrier according to an example implementation mode of the disclosure.

FIG. 9 is a flowchart illustrating a method for processing carrier resource of an unlicensed carrier according to an example implementation mode of the disclosure, and as shown in FIG. 9, the flow includes the following steps:

At S902: an LTE transmission node acquires at least one of utilization condition and interference condition of resources on the unlicensed spectrum in a corresponding detection window and adjusts at least one of a length of a transmission window, the maximum access times and the maximum access time according to at least one of the utilization condition and the interference condition of the resources on the unlicensed spectrum; and At S904: the LTE transmission node accesses, in a competitive way, the unlicensed spectrum in the transmission window, moreover a corresponding access times or access time is smaller than or equal to the maximum access times or the maximum access time determined by the detection window.

Example Implementation Mode 2

A specific embodiment of a adjustment of at least one of a length of a transmission window, the maximum access times and the maximum access time by a transmission node according to at least one of utilization condition and interference condition of resources on the unlicensed spectrum is described in the example implementation mode.

Specific Embodiment 1

Figure 10:
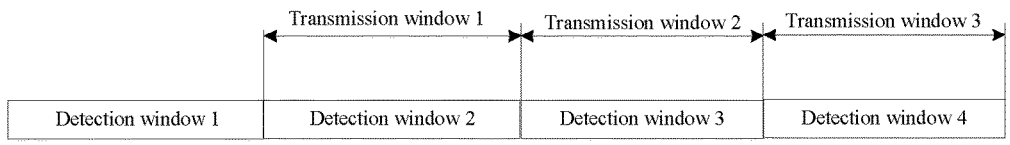
FIG. 10 is a schematic diagram illustrating a relationship between a detection window and a transmission window according to an example implementation mode of the disclosure.

FIG. 10 is a schematic diagram illustrating a relationship between a detection window and a transmission window according to an example implementation mode of the disclosure, and as shown in FIG. 10, a transmission window 1 is the first accessing window, a detection window corresponding to the transmission window 1 is a detection window 1, and a detection window corresponding to a transmission window 2 is a detection window 2, alternatively, detection windows corresponding to the transmission window 2 consist of the detection windows 1 and 2, detection windows for detecting a resource utilization rate consist of the detection windows 1 and 2, and the detection window for detecting an interference condition is the detection window 2.

A detection window corresponding to a transmission window 3 is a detection window 3, or detection windows corresponding to the transmission window 3 consist of the detection windows 1, 2 and 3, or detection windows corresponding to the transmission window 3 consist of the detection windows 2 and 3, detection windows for detecting a resource utilization rate consist of the detection windows 1, 2 and 3, and a detection window for detecting an interference condition is the detection window 3.

A resource and utilization rate and an interference condition can be detected herein using an existing technology which is not described here repeatedly.

Figure 11:
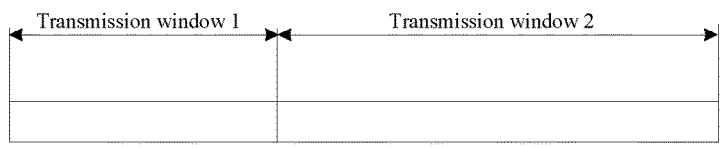
FIG. 11 is a schematic diagram illustrating a adjustment of a length of a transmission window according to at least one of utilization condition and interference condition of resources on an unlicensed resource that is obtained in a detection window corresponding to the transmission window according to a first example implementation mode of the disclosure.

FIG. 11 is a schematic diagram illustrating a adjustment of a length of a transmission window according to at least one of utilization condition and interference condition of resources on an unlicensed resource that is obtained in a detection window corresponding to the transmission window according to a first example implementation mode of the disclosure, as shown in FIG. 11, as the first accessing window, a transmission window 1 is as long as a corresponding detection window, alternatively, the transmission window 1 is of a preset length, for example, 100 ms. It is assumed that Kmax is a maximum value preset for a maximum access times, Kmin is a minimal value preset for the maximum access times; Lmin is a preset minimal transmission window length, Lmax is a preset maximum transmission window length, a preset LTE system occupancy rate is 70%, a preset resource utilization rate is 100%, and X is a preset value for evaluating an interference condition.

If it is detected in a detection window corresponding to a transmission window 2 that an LTE system occupies up to 80% of an unlicensed spectrum, the length of the transmission window 2 is increased with respect to the length of the transmission window 1, for instance, the transmission window 2 is 1.5 times the length of the transmission window 1, or if it is detected in the detection window corresponding to the transmission window 2 that the interference to an LTE transmission node is greater than X on the unlicensed spectrum, the length of the transmission window 2 is increased with respect to the length of the transmission window 1, for instance, the transmission window 2 is 2 times the length of the transmission window 1, or if it is detected in the detection window corresponding to the transmission window 2 that the utilization rate of the resources on the unlicensed spectrum is 100%, the length of the transmission window 2 is increased with respect to the length of the transmission window 1, for instance, the transmission window 2 is 1.5 times the length of the transmission window 1, or if it is detected in the detection window corresponding to the transmission window 2 that a utilization rate of residual resources on the unlicensed spectrum is 100% and the interference to an LTE transmission node is greater than X, the length of the transmission window 2 is increased with respect to the length of the transmission window 1, for instance, the transmission window 2 is 2 times the length of the transmission window 1, or if it is detected in the detection window corresponding to the transmission window 2 that a utilization rate of an LTE system is up to 80% on the unlicensed spectrum and the interference to an LTE transmission node is greater than X, the length of the transmission window 2 is increased with respect to the length of the transmission window 1, for instance, the transmission window 2 is 2 times the length of the transmission window 1, or the maximum access times in the transmission window 2 is greater than the preset maximum access times Kmax, the length of the transmission window 2 is increased with respect to the length of the transmission window 1, for instance, the transmission window 2 is 2 times the length of the transmission window 1; if the adjusted length of the transmission window is greater than Lmax, then the length of the transmission window is set to be Lmax.

Specific Embodiment 3

Figure 12:
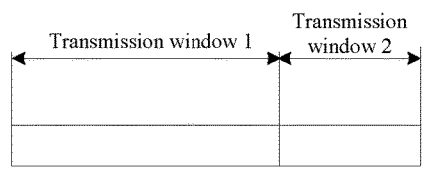
FIG. 12 is a schematic diagram illustrating a adjustment of a length of a transmission window according to at least one of utilization condition and interference condition of resources on an unlicensed resource that is obtained in a detection window corresponding to the transmission window according to a second example implementation mode of the disclosure.

FIG. 12 is a schematic diagram illustrating a adjustment of a length of a transmission window according to at least one of utilization condition and interference condition of resources on an unlicensed resource that is obtained in a detection window corresponding to the transmission window according to a second example implementation mode of the disclosure; as shown in FIG. 12, as the first accessing window, a transmission window 1 is as long as a corresponding detection window, alternatively, the transmission window 1 is of a preset length, for example, 100 ms. It is assumed that Tmax is a maximum value preset for a maximum access time, Tmin is a minimal value preset for the maximum access time; Lmin is a preset minimal transmission window length, Lmax is a preset maximum transmission window length, a preset LTE system occupancy rate is 70%, a preset resource utilization rate is 100%, and X is a preset value for evaluating an interference condition.

If it is detected in a detection window corresponding to a transmission window 2 that an LTE system occupies up to 20% of an unlicensed spectrum, the length of the transmission window 2 is decreased with respect to the length of the transmission window 1, for instance, the transmission window 2 is half the length of the transmission window 1, or if it is detected in the detection window corresponding to the transmission window 2 that the interference to an LTE transmission node is smaller than X on the unlicensed spectrum, the length of the transmission window 2 is decreased with respect to the length of the transmission window 1, for instance, the transmission window 2 is 0.8 times the length of the transmission window 1, or If it is detected in the detection window corresponding to the transmission window 2 that the utilization rate of the resources on the unlicensed spectrum is 80%, the length of the transmission window 2 is decreased with respect to the length of the transmission window 1, for instance, the transmission window 2 is half the length of the transmission window 1, or if it is detected in the detection window corresponding to the transmission window 2 that the utilization rate of the resources on the unlicensed spectrum is up to 80% and the interference to an LTE transmission node is smaller than X, the length of the transmission window 2 is decreased with respect to the length of the transmission window 1, for instance, the transmission window 2 is half the length of the transmission window 1, or the maximum access time in the transmission window 2 reaches the minimal value Tmin preset for the maximum access time, the length of the transmission window 2 is decreased with respect to the length of the transmission window 1, for instance, the transmission window 2 is 0.7 times the length of the transmission window 1. If the adjusted length of the transmission window is smaller than Lmin, then the length of the transmission window is set to be Lmin.

Specific Embodiment 4

Figure 13:
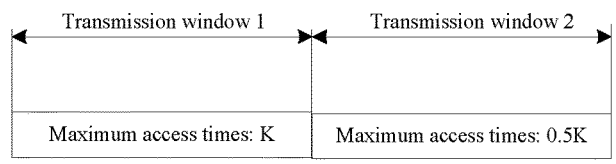
FIG. 13 is a schematic diagram illustrating a adjustment of the maximum access times/the maximum access time in a transmission window according to at least one of utilization condition and interference condition of resources on an unlicensed resource that is obtained in a detection window corresponding to the transmission window according to a first example implementation mode of the disclosure.

FIG. 13 is a schematic diagram illustrating a adjustment of the maximum access times/the maximum access time in a transmission window according to at least one of utilization condition and interference condition of resources on an unlicensed resource that is obtained in a detection window corresponding to the transmission window according to a first example implementation mode of the disclosure; as shown in FIG. 13, as the first accessing window, a transmission window 1 is as long as a corresponding detection window, alternatively, the transmission window 1 is of a preset length, for example, 100 ms. A number of LTE transmission nodes is Z, and the transmission time of an LTE transmission node competitively winning a resource is A. It is assumed that Kmax is a maximum value preset for a maximum access times, Kmin is a minimal value preset for the maximum access times; Lmin is a preset minimal transmission window length, Lmax is a preset maximum transmission window length, a preset LTE system occupancy rate is 70%, a preset resource utilization rate is 100%, and X is a preset value for evaluating an interference condition.

If it is detected in a detection window corresponding to the transmission window 1 that the transmission time of an LTE system is X on an unlicensed spectrum and a resource idleness time is Y, then the maximum access times K of an LTE transmission node is (X+Y)/Z/A.

If it is detected in a detection window corresponding to a transmission window 2 that an LTE system occupies up to 80% of the unlicensed spectrum, a maximum access times corresponding to the transmission window 2 is decreased with respect to the length of the transmission window 1, for instance, the maximum access times corresponding to the transmission window 2 is half as many as that corresponding to the transmission window 1, or if it is detected in the detection window corresponding to the transmission window 2 that the interference to an LTE transmission node is greater than X on the unlicensed spectrum, the maximum access times corresponding to the transmission window 2 is decreased with respect to the length of the transmission window 1, for instance, the maximum access times corresponding to the transmission window 2 is half as many as that corresponding to the transmission window 1, or if it is detected in the detection window corresponding to the transmission window 2 that the utilization rate of the resources on the unlicensed spectrum is 100%, the maximum access times corresponding to the transmission window 2 is decreased with respect to the length of the transmission window 1, for instance, the maximum access times corresponding to the transmission window 2 is half as many as that corresponding to the transmission window 1, or if it is detected in the detection window corresponding to the transmission window 2 that the utilization rate of the resources on the unlicensed spectrum is 100% and the interference to an LTE transmission node is greater than X, the maximum access times of the transmission window 2 is decreased with respect to the length of the transmission window 1, for instance, the maximum access times corresponding to the transmission window 2 is half as many as that corresponding to the transmission window 1, or if it is detected in the detection window corresponding to the transmission window 2 that an LTE system occupies up to 80% of the unlicensed spectrum and the interference to an LTE transmission node is greater than X, the maximum access times corresponding to the transmission window 2 is decreased with respect to the length of the transmission window 1, for instance, the maximum access times corresponding to the transmission window 2 is half as many as that corresponding to the transmission window 1, or if it is detected in the detection window corresponding to the transmission window 2 that that an LTE system occupies up to 80% of the unlicensed spectrum and the utilization rate of the resources on the unlicensed spectrum is 100%, the maximum access times corresponding to the transmission window 2 is decreased with respect to the length of the transmission window 1, for instance, the maximum access times corresponding to the transmission window 2 is half as many as that corresponding to the transmission window 1, or if it is detected in the detection window corresponding to the transmission window 2 that an LTE system occupies up to 80% of the unlicensed spectrum, the utilization rate of the resources on the unlicensed spectrum is 100% and the interference to an LTE transmission node is greater than X, the maximum access times corresponding to the transmission window 2 is decreased with respect to the length of the transmission window 1, for instance, the maximum access times corresponding to the transmission window 2 is half as many as that corresponding to the transmission window 1, or If it is detected in the detection window corresponding to the transmission window 2 that an LTE system occupies up to 50% of the unlicensed spectrum, the utilization rate of the resources on the unlicensed spectrum is 100% and the interference to an LTE transmission node is greater than X, the maximum access times corresponding to the transmission window 2 is decreased with respect to the length of the transmission window 1, for instance, the maximum access times corresponding to the transmission window 2 is half as many as that corresponding to the transmission window 1, or it should be noted that if the adjusted maximum access times is smaller than Kmin, then the maximum access times is set to be Kmin.

Specific Embodiment 5

Figure 14:
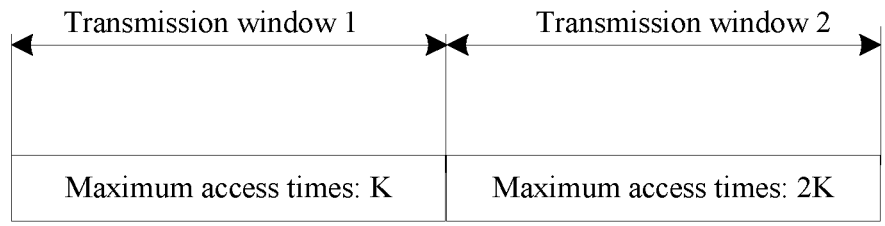
FIG. 14 is a schematic diagram illustrating a adjustment of the maximum access times/the maximum access time in a transmission window according to at least one of utilization condition and interference condition of resources on an unlicensed resource that is obtained in a detection window corresponding to the transmission window according to a second example implementation mode of the disclosure.

FIG. 14 is a schematic diagram illustrating a adjustment of the maximum access times/the maximum access time in a transmission window according to at least one of utilization condition and interference condition of resources on an unlicensed resource that is obtained in a detection window corresponding to the transmission window according to a second example implementation mode of the disclosure; as shown in FIG. 14, as the first accessing window, a transmission window 1 is as long as a corresponding detection window, alternatively, the transmission window 1 is of a preset length, for example, 100 ms. A number of LTE transmission nodes is Z, and the transmission time of an LTE transmission node competitively winning a resource is A, a preset LTE system occupancy rate is 70%, a preset resource utilization rate is 100%, and X is a preset value for evaluating an interference condition.

If it is detected in a detection window corresponding to the transmission window 1 that the transmission time of an LTE system is X on the unlicensed spectrum and a resource idleness time is Y, then the maximum access times K of an LTE transmission node is $(X+Y)/Z/A$.

If it is detected in a detection window corresponding to a transmission window 2 that an LTE system occupancy time is up to 40% on the unlicensed spectrum, the maximum access times corresponding to the transmission window 2 is increased with respect to the maximum access times corresponding to the transmission window 1, for instance, the maximum access times corresponding to the transmission window 2 is twice the maximum access times corresponding to the transmission window 1, or if it is detected in the detection window corresponding to the transmission window 2 that the interference to an LTE transmission node on the unlicensed spectrum is smaller than X, the maximum access times corresponding to the transmission window 2 is increased with respect to the maximum access times corresponding to the transmission window 1, for instance, the maximum access times corresponding to the transmission window 2 is three times as many as the maximum access times corresponding to the transmission window 1, or if it is detected in the detection window corresponding to the transmission window 2 that the utilization rate of the resources on the unlicensed spectrum is 50%, the maximum access times corresponding to the transmission window 2 is increased with respect to the maximum access times corresponding to the transmission window 1, and for instance, the maximum access times corresponding to the transmission window 2 is twice as many as the maximum access times corresponding to the transmission window 1, or if it is detected in the detection window corresponding to the transmission window 2 that the utilization rate of the resources on the unlicensed spectrum is 50% and the interference to an LTE transmission node is smaller than X, the maximum access times corresponding to the transmission window 2 is increased with respect to the maximum access times corresponding to the transmission window 1, for instance, the maximum access times corresponding to the transmission window 2 is twice as many as the maximum access times corresponding to the transmission window 1, or if it is detected in the detection window corresponding to the transmission window 2 that an LTE system occupancy time is 40% on the unlicensed spectrum and the interference to an LTE transmission node is smaller than X, the maximum access times corresponding to the transmission window 2 is increased with respect to the maximum access times corresponding to the transmission window 1, for instance, the maximum access times corresponding to the transmission window 2 is twice as many as the maximum access times corresponding to the transmission window 1, or if it is detected in the detection window corresponding to the transmission window 2 that an LTE system occupancy time is 40% on the unlicensed spectrum and the utilization rate of the resources on the unlicensed spectrum is 80%, the maximum access times corresponding to the transmission window 2 is increased with respect to the maximum access times corresponding to the transmission window 1, for instance, the maximum access times corresponding to the transmission window 2 is twice as many as the maximum access times corresponding to the transmission window 1, or if it is detected in the detection window corresponding to the transmission window 2 that an LTE system occupancy time is 40% on the unlicensed spectrum, the utilization rate of the resources on the unlicensed spectrum is 80% and the interference to an LTE transmission node is smaller than X, the maximum access times corresponding to the transmission window 2 is increased with respect to the maximum access times corresponding to the transmission window 1, for instance, the maximum access times corresponding to the transmission window 2 is twice as many as the maximum access times corresponding to the transmission window 1, or if it is detected in the detection window corresponding to the transmission window 2 that an LTE system occupancy time is 50% on the unlicensed spectrum, the utilization rate of the residual resources on the unlicensed spectrum is 100% and the interference to an LTE transmission node is smaller than X, the maximum access times corresponding to the transmission window 2 is equal to the maximum access times corresponding to the transmission window 1.

It should be noted that if the adjusted maximum access times is greater than Kmax, then the maximum access times is set to be Kmax.

Example Implementation Mode 3

A specific embodiment of the access of an LTE transmission node to an unlicensed spectrum in a competitive way is described in the example implementation mode.

Specific Embodiment 1

Figure 15:
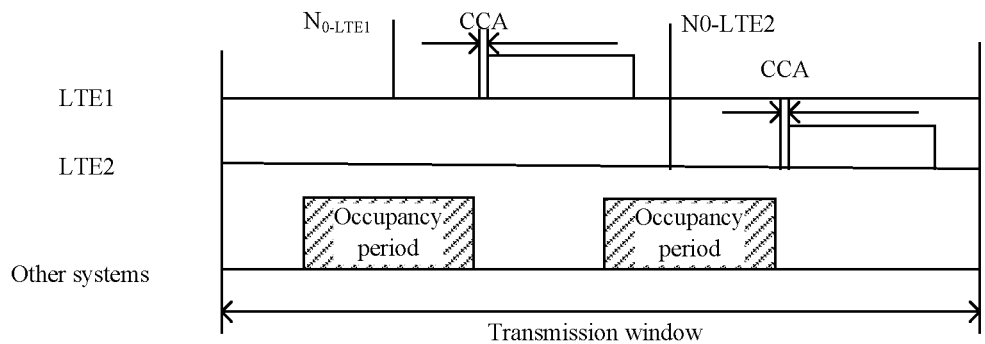
FIG. 15 is a schematic diagram illustrating an access of an LTE transmission node to an unlicensed spectrum in a competitive way according to a first example implementation mode of the disclosure.

FIG. 15 is a schematic diagram illustrating an access of an LTE transmission node to an unlicensed spectrum in a competitive way according to a first example implementation mode of the disclosure, and as shown in FIG. 15, it is assumed that access times of an LTE transmission node 1 is one time, access times of an LTE transmission node 2 is one time and the maximum access times obtained by a detection window is 3 times.

The LTE transmission node 1 generates one random number N0-LTE1 in [0,Y], the LTE transmission node 2 generates one random number N0-LTE2 in [0,Y], in the embodiment, Y is calculated by rounding up the quotient of the length of a transmission window and a fixed length, wherein the fixed length is a positive integer greater than 10.

The LTE transmission node 1 starts to detect the state of the unlicensed carrier from the time point N0-LTE1 and accesses the unlicensed spectrum to start to send data after detecting an idle time period of the length of a CCA, moreover the length of the CCA is smaller than or equal to 50 us.

The LTE transmission node 2 starts to detect the state of the unlicensed carrier from the time point N0-LTE2 and accesses the unlicensed spectrum to start to send data after detecting an idle time period of the length of a CCA, moreover the length of the CCA is smaller than or equal to 50 us.

Specific Embodiment 2

FIG. 15 is a schematic diagram illustrating an access of an LTE transmission node to an unlicensed spectrum in a competitive way according to a first example implementation mode of the disclosure, and as shown in FIG. 15, it is assumed that access time of an LTE transmission node 1 is 10 ms, access time of an LTE transmission node 2 is 10 ms per time and the maximum access time obtained by a detection window is 30 ms. If it is assumed that the transmission time of each access is 10 ms, then the transmission node can access the unlicensed spectrum for one time, and the transmission node 2 can access the unlicensed spectrum for one time.

The LTE transmission node 1 generates one random number N0-LTE1 in [0,Y], the LTE transmission node 2 generates one random number N0-LTE2 in [0,Y], in this embodiment, Y is calculated by rounding up the quotient of the length of a transmission window and a fixed length, where the fixed length is a positive integer greater than 10.

The LTE transmission node 1 starts to detect the state of the unlicensed carrier from the time point N0-LTE1 and accesses the unlicensed spectrum to start to send data after detecting an idle time period of the length of a CCA, moreover the length of the CCA is greater than 20 us but smaller than or equal to 50 us.

The LTE transmission node 2 starts to detect the state of the unlicensed carrier from the time point N0-LTE2 and accesses the unlicensed spectrum to start to send data after detecting an idle time period of the length of a CCA, moreover the length of the CCA is greater than 20 us but smaller than or equal to 50 us.

Specific Embodiment 3

Figure 16:
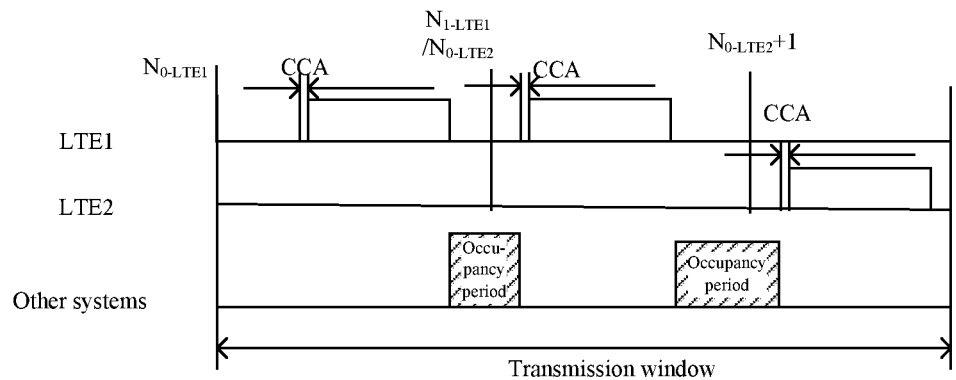
FIG. 16 is a schematic diagram illustrating an access of an LTE transmission node to an unlicensed spectrum in a competitive way according to a second example implementation mode of the disclosure.

FIG. 16 is a schematic diagram illustrating an access of an LTE transmission node to an unlicensed spectrum in a competitive way according to a second example implementation mode of the disclosure, and as shown in FIG. 16, it is assumed that access times of an LTE transmission node 1 is 2 times, access times of an LTE transmission node 2 is one time and the maximum access times obtained by a detection window is 3 times.

The LTE transmission node 1 generates two random numbers N0-LTE1 and N1-LTE1 in [0,Y], the LTE transmission node 2 generates one random number N0-LTE2 in [0,Y], in which N1-LTE1 is equal to N0-LTE2.

The LTE transmission node 1 starts to detect the state of the unlicensed carrier from the time point N0-LTE1 and accesses the unlicensed spectrum to start to send data after detecting an idle time period of the length of a CCA, moreover the length of the CCA is greater than 20 us but smaller than or equal to 50 us; and when accessing the unlicensed carrier for the first time, the LTE transmission node 1 carries information N1-LTE1 indicating the start time point of the second access of the LTE transmission node 1.

The LTE transmission node 2 receives the N1-LTE1, because the N1-LTE1 is equal to the N0-LTE2 and the priority of the LTE transmission node 2 is lower than the priority of the LTE transmission node 1, the LTE transmission node 2 starts to detect the state of the unlicensed carrier from the time point N0-LTE2_1 and accesses the unlicensed spectrum to start to send data after detecting an idle time period of the length of a CCA, moreover the length of the CCA is smaller than or equal to 50 us.

Apparently, it should be appreciated by those skilled in the art that each component or step described in the disclosure can be realized by a universal computer and that the components or steps may be integrated on a single computer or distributed on a network consisting of a plurality of computers, optionally, the components or steps may be realized by executable program codes so that the components or steps can be stored in a memory to be executed by a computer, and in some cases, the steps shown or described herein can be executed in a sequence different from this presented herein, or the components or steps are formed into integrated circuit components, or several of the components or steps are formed into integrated circuit components. Therefore, the disclosure is not limited to the combination of specific hardware and software.

Although certain example embodiments of the disclosure have been described above, it should be appreciated that the preferred embodiments are not described for limiting the disclosure and that a variety of modifications and variations can be devised by those of ordinary skill in the art. Any modification, equivalent substitute and improvement that can be devised by those of ordinary skill in the art without departing from the spirit of the disclosure and that the modifications and improvements shall fall within the protection scope of the disclosure.

INDUSTRIAL APPLICABILITY

The foregoing embodiments and example embodiments address a problem of a coexistence of a system working on an unlicensed carrier with other systems and consequentially realize the coexistence of the system working on the unlicensed carrier with other systems, for example, the foregoing embodiments and example embodiments increase a utilization rate of the unlicensed carrier by making full use of idle resources of the unlicensed carrier.

What is claimed is:

1. A method for processing carrier resource of an unlicensed carrier, comprising:
    determining, in a competitive way, to access the unlicensed carrier in a transmission window; and
    accessing, according to a predetermined access condition, the unlicensed carrier, wherein the predetermined access condition includes at least one of: a determined length of the transmission window, the maximum access times in the transmission window and the maximum access time in the transmission window;
    wherein the predetermined access condition is determined in at least one of the following way: the length of the transmission window is determined in at least one of the following ways: the length of the transmission window is predefined, the length of the transmission window is indicated by a high-layer signaling, and the length of the transmission window is obtained by being adjusted according to at least one of utilization condition and interference condition of resources on the unlicensed resource which is obtained in a detection window corresponding to the transmission window; the maximum access times or the maximum access time in the transmission window is determined in the following way: the maximum access times or the maximum access time is obtained by being adjusted according to at least one of utilization condition and interference condition of resources on the unlicensed resource which is obtained in a detection window corresponding to the transmission window.

2. The method as claimed in claim 1, wherein determining, in the competitive way, to access the unlicensed carrier in the transmission window comprises:
    generating k random numbers $N_0, N_1, N_{1,k-1}$ in the transmission window $[0, Y]$, wherein $N_j$ represents a start time point of the jth accessing the unlicensed carrier and $0<j<=k-1$, a value of k is determined according to a quantity of data to be transmitted and a time period consumed for accessing the unlicensed carrier every time, a value of Y is determined according to the length of the transmission window; and
    starting the jth accessing the unlicensed carrier from the time point $N_j$ when an idle time period of a length of a Clear Channel Assessment (CCA) is detected from the time point $N_j$.

3. The method as claimed in claim 1, wherein determining, in a competitive way, to access the unlicensed carrier in the transmission window comprises:
    determining whether or not a transmission node conflicts with another transmission node according to received access information, wherein the access information refers to information, which is sent by the other transmission node and, during the jth accessing the unlicensed carrier, corresponds to the rest (k-j) times of accessing the unlicensed carrier, wherein k is a total access times in the transmission windows and $0<j<=k-1$; and
    determining to access the unlicensed carrier according to priorities of transmission nodes when a determination result is that the transmission node conflicts with the other transmission node.

4. The method as claimed in claim 3, wherein before accessing the unlicensed carrier according to the priorities of transmission nodes, the method further comprises: determining a priority of the transmission node according to at least one of the following factors:
    start time point for accessing, by the transmission node, the unlicensed carrier;
    start time point for once before accessing, by the transmission node, the unlicensed carrier starts; and
    a priority of a service on the transmission node.

5. The method as claimed in claim 1, wherein before accessing the unlicensed carrier according to the predetermined access condition, the method further comprises:
    adjusting the length of the transmission window according to at least one of the utilization condition and the interference condition of the resources on the unlicensed resource that is obtained in the detection window corresponding to the transmission window, wherein the length of the transmission window is increased or decreased with respect to a length of a former transmission window; and
    adjusting the maximum access times or the maximum access time according to at least one of the utilization condition and the interference condition of the resources on the unlicensed resource that is obtained in the detection window corresponding to the transmission window, wherein the maximum access times or the maximum access time in the transmission window is increased or decreased with respect to the maximum access times or the maximum access time in a former transmission window.

6. The method as claimed in claim 5, wherein the length of the transmission window is increased with respect to the length of the former transmission window when at least one of the following conditions is met:
    a occupancy rate of the unlicensed carrier in the detection window corresponding to the transmission window is detected to be greater than a first preset threshold;
    a utilization rate of the unlicensed carrier in the detection window corresponding to the transmission window is detected to be smaller than a second preset threshold;
    a level of interference to the transmission node in the detection window corresponding to the transmission window is detected to be greater than a third preset threshold;

the maximum access times in the transmission window is greater than a maximum value preset for the maximum access times; and the maximum access time in the transmission window is greater than a maximum value preset for the maximum access time.

7. The method as claimed in claim 5, wherein the length of the transmission window is decreased with respect to the length of the former transmission window when at least one of the following conditions is met:
a occupancy rate of the unlicensed carrier in the detection window corresponding to the transmission window is detected to be smaller than a first preset threshold;
a utilization rate of the unlicensed carrier in the detection window corresponding to the transmission window is detected to be smaller than a second preset threshold;
a level of interference to the transmission node in the detection window corresponding to the transmission window is detected to be smaller than a third preset threshold;
the maximum access times in the transmission window is smaller than a minimal value preset for the maximum access times; and
the maximum access time in the transmission window is smaller than a minimal value preset for the maximum access time.

8. The method as claimed in claim 5, wherein the maximum access times or the maximum access time in the transmission window is increased with respect to the maximum access times or the maximum access time in the former transmission window when at least one of the following conditions is met:
a occupancy rate of the unlicensed carrier in the detection window corresponding to the transmission window is detected to be smaller than a first preset threshold;
a utilization rate of the unlicensed carrier in the detection window corresponding to the transmission window is smaller than a second preset threshold;
a level of interference to the transmission node in the detection window corresponding to the transmission window is smaller than a third preset threshold; and
the length of the transmission window reaches a preset maximum transmission window length.

9. The method as claimed in claim 5, wherein the maximum access times or the maximum access time in the transmission window is decreased with respect to the maximum access times/ the maximum access time in the former transmission window when at least one of the following conditions is met:
a occupancy rate of the unlicensed carrier in the detection window corresponding to the transmission window is greater than a first preset threshold;
a utilization rate of the unlicensed carrier in the detection window corresponding to the transmission window is greater than a second preset threshold;
a level of interference to the transmission node in the detection window corresponding to the transmission window is greater than a third preset threshold; and
the length of the transmission window reaches a preset minimal transmission window length.

10. The method as claimed in claim 5, wherein in a case where the adjusted length of the transmission window is greater than the preset maximum transmission window length, the length of the transmission window is determined to be the preset maximum transmission window length, and in a case where the adjusted length of the transmission window is smaller than the preset minimal transmission window length, the length of the transmission window is determined to be the preset minimal transmission window length; and
in a case where the adjusted maximum access times is greater than the maximum value preset for the maximum access times, the maximum access times is determined to be the maximum value preset for the maximum access times; in a case where the adjusted maximum access time is greater than the maximum value preset for the maximum access time, the maximum access time is determined to be the maximum value preset for the maximum access time; in a case where the adjusted maximum access times is smaller than the minimal value preset for the maximum access times, the maximum access times is determined to be the minimal value preset for the maximum access times; and in a case where the adjusted maximum access time is smaller than the minimal value preset for the maximum access time, the maximum access time is determined to be the minimal value preset for the maximum access time.

11. The method as claimed in claim 1, wherein the detection window comprises at least one of:
a former transmission window of the transmission window, a part of a former transmission window of the transmission window, N preceding transmission windows of the transmission window, and a window with a preset time length, wherein N is an integer and is greater than 1.

12. A device for processing carrier resource of an unlicensed carrier, comprising a hardware processor and a memory, and the hardware processor is configured to execute program components stored on the memory, the program components comprising:
a first determination component arranged to determine, in a competitive way, to access to the unlicensed carrier in a transmission window; and
an access component arranged to access, according to a predetermined access condition, the unlicensed carrier, wherein the predetermined access condition includes at least one of: a determined length of the transmission window, the maximum access times in the transmission window and the maximum access time in the transmission window;
wherein the predetermined access condition is determined in at least one of the following way: the length of the transmission window is determined in at least one of the following ways: the length of the transmission window is predefined, the length of the transmission window is indicated by a high-layer signaling, and the length of the transmission window is obtained by being adjusted according to at least one of utilization condition and interference condition of resources on the unlicensed resource which is obtained in a detection window corresponding to the transmission window; the maximum access times or the maximum access time in the transmission window is determined in the following way: the maximum access times or the maximum access time is obtained by being adjusted according to at least one of utilization condition and interference condition of resources on the unlicensed resource which is obtained in a detection window corresponding to the transmission window.

13. The device as claimed in claim 12, wherein the first determination component comprises:
a generation element arranged to generate k random numbers $N_0, N_1, \ldots N_{k-1}$ in the transmission window [0, Y], wherein $N_j$ represents a start time point of the jth accessing to the unlicensed carrier starts and $0<j<=k-1$, a value of k is determined according to a quantity of data to be transmitted and a time period consumed for accessing the unlicensed carrier every time, a value of Y is determined according to the length of the transmission window; and a first determination element arranged to start the jth accessing to the unlicensed carrier from the time point $N_j$ when an idle time period of a length of a Clear Channel Assessment (CCA) is detected from the time point $N_j$.

14. The device as claimed in claim 13, further comprising:
a first adjustment component arranged to adjust the length of the transmission window according to at least one of the utilization condition and the interference condition of the resources on the unlicensed resource that is obtained in the detection window corresponding to the transmission window, wherein the length of the transmission window is increased or decreased with respect to a length of a former transmission window; and
a second adjustment component arranged to adjust the maximum access times or the maximum access time according to at least one of the utilization condition and the interference condition of the resources on the unlicensed resource that is obtained in the detection window corresponding to the transmission window, wherein the maximum access times or the maximum access time in the transmission window is increased or decreased with respect to the maximum access times or the maximum access time in a former transmission window.

15. The device as claimed in claim 14, wherein the first adjustment component is also arranged to increase the length of the transmission window with respect to the length of the former transmission window when at least one of the following conditions is met: a occupancy rate of the unlicensed carrier in the detection window corresponding to the transmission window is detected to be greater than a first preset threshold; a utilization rate of the unlicensed carrier in the detection window corresponding to the transmission window is detected to be smaller than a second preset threshold; a level of interference to the transmission node in the detection window corresponding to the transmission window is detected to be greater than a third preset threshold; the maximum access times in the transmission window is greater than a maximum value preset for the maximum access times; and the maximum access time in the transmission window is greater than a minimal value of a preset maximum access times;
or the first adjustment component is also arranged to decrease the length of the transmission window with respect to the length of the former transmission window when at least one of the following conditions is met: a occupancy rate of the unlicensed carrier in the detection window corresponding to the transmission window is detected to be smaller than a first preset threshold; a utilization rate of the unlicensed carrier in the detection window corresponding to the transmission window is detected to be smaller than a second preset threshold; a level of interference to the transmission node in the detection window corresponding to the transmission window is detected to be smaller than a third preset threshold; the maximum access times in the transmission window is smaller than a minimal value preset for the maximum access times; and the maximum access time in the transmission window is smaller than a minimal value of a preset maximum access time;
or the second adjustment component is also arranged to increase the maximum access times or the maximum access time in the transmission window with respect to the maximum access times or the maximum access time in the former transmission window when at least one of the following conditions is met: a occupancy rate of the unlicensed carrier in the detection window corresponding to the transmission window is detected to be smaller than a first preset threshold; a utilization rate of the unlicensed carrier in the detection window corresponding to the transmission window is smaller than a second preset threshold; a level of interference to the transmission node in the detection window corresponding to the transmission window is smaller than a third preset threshold; and the length of the transmission window reaches a preset maximum transmission window length;
or the second adjustment component is also arranged to decrease the maximum access times or the maximum access time in the transmission window with respect to the maximum access times/ the maximum access time in the former transmission window when at least one of the following conditions is met: a occupancy rate of the unlicensed carrier in the detection window corresponding to the transmission window is greater than a first preset threshold; a utilization rate of the unlicensed carrier in the detection window corresponding to the transmission window is greater than a second preset threshold; a level of interference to the transmission node in the detection window corresponding to the transmission window is greater than a third preset threshold; and the length of the transmission window reaches a preset minimal transmission window length.

16. The device as claimed in claim 14, wherein
the second determination component is arranged to determine the length of the transmission window to be the preset maximum transmission window length in a case where the adjusted length of the transmission window is greater than the preset maximum transmission window length, determine the length of the transmission window to be the preset minimal transmission window length in a case where the adjusted length of the transmission window is smaller than the preset minimal transmission window length; and
the third determination component is arranged to determine the maximum access times is determined to be the maximum value preset for the maximum access times in a case where the adjusted maximum access times is greater than the maximum value preset for the maximum access times; determine the maximum access time to be the maximum value preset for the maximum access time in a case where the adjusted maximum access time is greater than the maximum value preset for the maximum access time; determine the maximum access times to be the minimal value preset for the maximum access times in a case where the adjusted maximum access times is smaller than the minimal value preset for the maximum access times; and determine the maximum access time to be the minimal value preset for the maximum access time in a case where the adjusted maximum access time is smaller than the minimal value preset for the maximum access time.

17. The device as claimed in claim 12, wherein the first determination component comprises:

a determination element arranged to determine whether or not a transmission node conflicts with another transmission node according to the received access information, wherein the access information refers to information, which is sent by the other transmission node and, during the jth accessing the unlicensed carrier, corresponds to the rest (k-j) times of accessing the unlicensed carrier, wherein k is a total access times in the transmission windows and $0<j<=k-1$; and a second determination element arranged to determine to access the unlicensed carrier according to priorities of transmission nodes when a determination result is that the transmission node conflicts with the other transmission node.

18. The device as claimed in claim 17, further comprising:
a third determination element arranged to determine a priority of the transmission node according to at least one of the following factors:
start time point for accessing, by the transmission node, the unlicensed carrier;
start time point for once before accessing, by the transmission node, the unlicensed carrier starts; and
a priority of a service on the transmission node.

19. A transmission node comprising the device as claimed in claim 12.

* * * * *